(12) United States Patent
Ghosh et al.

(10) Patent No.: US 7,664,873 B1
(45) Date of Patent: Feb. 16, 2010

(54) GENERATING PATH-CENTRIC TRAFFIC INFORMATION FOR ANALYSIS USING AN ASSOCIATION OF PACKET-CENTRIC INFORMATION TO PATH-CENTRIC INFORMATION

(75) Inventors: Kaushik Ghosh, Sunnyvale, CA (US); Manoj Leelanivas, Los Gatos, CA (US); Dennis Ferguson, Mountain View, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 1910 days.

(21) Appl. No.: 09/885,485

(22) Filed: Jun. 20, 2001

(51) Int. Cl.
*G06F 15/173* (2006.01)

(52) U.S. Cl. .................. 709/238; 709/224; 709/242; 709/246; 370/230; 370/351

(58) Field of Classification Search ......... 709/238–242, 709/223–229, 245–246; 707/100–104; 370/229–230, 370/351–352, 401
See application file for complete search history.

(56) References Cited

U.S. PATENT DOCUMENTS

| | | | |
|---|---|---|---|
| 6,745,243 B2 * | 6/2004 | Squire et al. | 709/227 |
| 6,771,637 B1 * | 8/2004 | Suzuki et al. | 370/352 |
| 6,862,622 B2 * | 3/2005 | Jorgensen | 709/226 |

* cited by examiner

*Primary Examiner*—Bharat N Barot
(74) *Attorney, Agent, or Firm*—Straub & Pokotylo; John C. Pokotylo (57) ABSTRACT

Samples from an addressed data forwarding devices, such as a router, are associated with path-centric information. Information from the samples is used to update corresponding path-centric traffic information, such as flow information for example. The aggregated path-centric traffic information can then be used by traffic analysis operations.

22 Claims, 11 Drawing Sheets

| 512 | 514 | 516 | 518 | 520 | 522 |
|---|---|---|---|---|---|
| TIME STAMP | TYPE | LENGTH | IP PREFIX (KEY) | PREFIX LENGTH | AS INDEX |
|  |  |  |  |  |  ← 510a |
| . | . | . | . | . | . |
| . | . | . | . | . | . |
| . | . | . | . | . | . |
|  |  |  |  |  |  ← 510b |

| 612 | 614 | 616 | 618 |
|---|---|---|---|
| TYPE | LENGTH | AS PATH | AS INDEX (KEY) |
|  |  |  |  ← 610a |
| . | . | . | . |
| . | . | . | . |
| . | . | . | . |
|  |  |  |  ← 610b |

GENERATING PATH-CENTRIC TRAFFIC INFORMATION FOR ANALYSIS USING AN ASSOCIATION OF PACKET-CENTRIC INFORMATION TO PATH-CENTRIC INFORMATION

§ 1. BACKGROUND OF THE INVENTION

§ 1.1 Field of the Invention

The present invention concerns analyzing traffic (e.g., flow information) in a network, or inter-network. In particular, the present invention concerns generating traffic (e.g., flow) information for such analysis.

§ 1.2 Description of Related Art

The description of art in this section is not, and should not be interpreted to be, an admission that such art is prior art to the present invention.

Since the present invention may be used in the context of networks and inter-networks, both are introduced in § 1.2.1 below. Then, the need for network analysis is introduced in § 1.2.2 below. Finally, challenges to collecting information for network analysis are introduced in § 1.2.3 below.

§ 1.2.1 Networks and Inter-Networks

Many large networks are made up of interconnected nodes (referred to as "routers" in the specification below without loss of generality) for forwarding addressed data (referred to as "packets" in the specification below without loss of generality). The routers may be geographically distributed throughout a region and connected by links (e.g., optical fiber, copper cable, wireless transmission channels, etc.). In such a network, each router typically interfaces with (e.g., terminates) multiple input links and multiple output links. Packets traverse the network by being forwarded from router to router until they reach their destinations (as typically specified in by so-called layer-3 addresses in the packet headers). Unlike switches, which establish a connection for the duration of a "call" or "session" to send data received on a given input port out on a given output port, routers determine the destination addresses of received (ingress) packets and, based on these destination addresses, determine, in each case, the appropriate output link on which to send them. Since, unlike switches, routers are not connection-based—packets having the same destination address may actually traverse different paths through the network.

Figure 1:
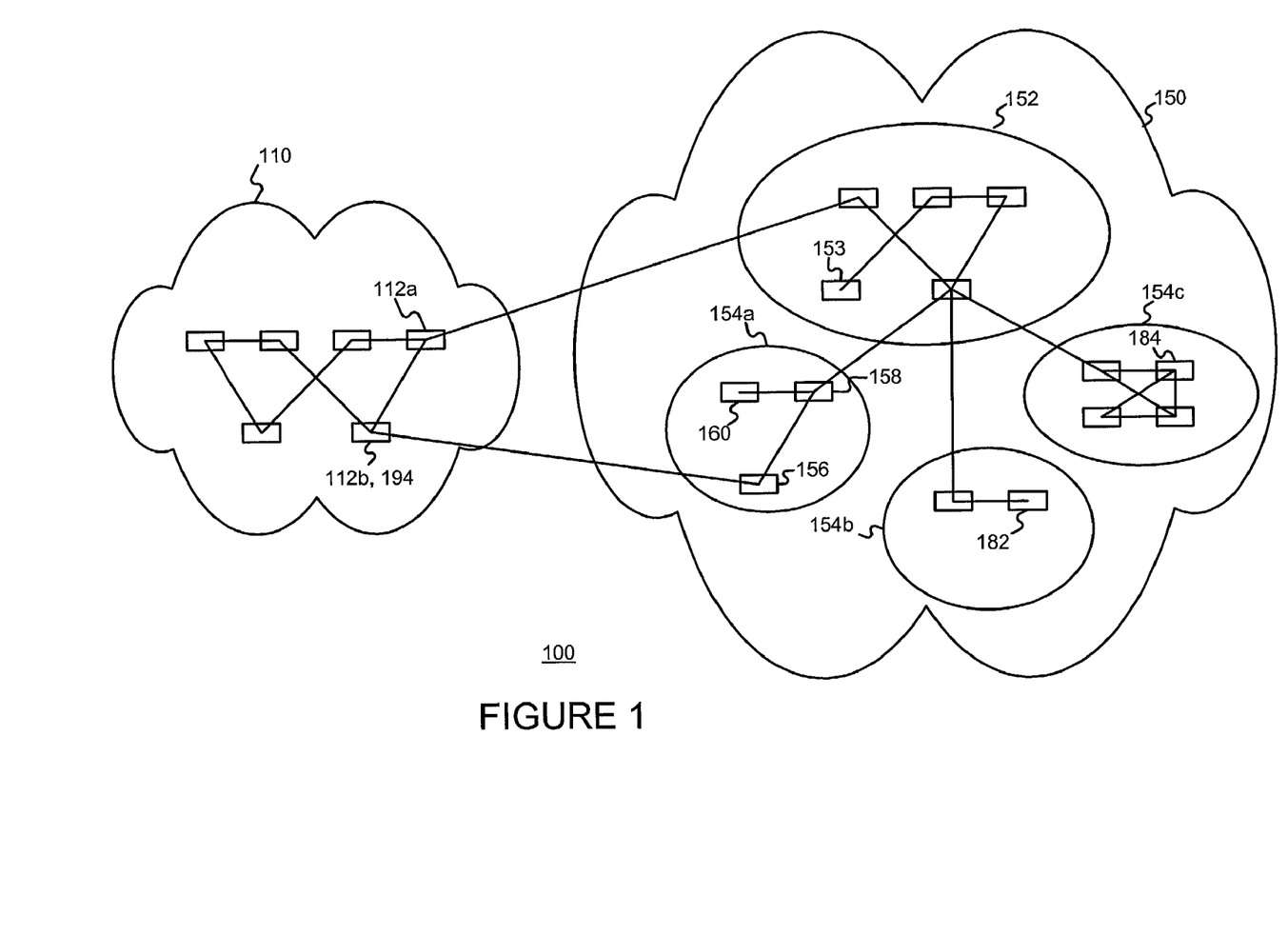
FIG. 1 is a high-level diagram that illustrates an internet in which the present invention may be used.

FIG. 1 illustrates an internet in which the present invention may be used. As illustrated in FIG. 1, an internet 100 may be viewed as a number of sub-networks or "autonomous systems" (also referred to as "AS") 110, 150. Different entities (such as Internet service providers ("ISPs")) may own and/or operate different autonomous systems. A routing algorithm for use within an autonomous system is called an "interior gateway protocol" ("IGP"), while a routing algorithm for use between autonomous systems is called an "exterior gateway protocol" ("EGP"). Known exterior gateway protocols include the "border gateway protocol" ("BGP").

Some autonomous systems (ASes) may become quite large, and their management may become quite complex. In such instances, hierarchical routing techniques may be used to define the large autonomous system as a number of smaller regions. Typically, routers within a given region only know the detailed topology of the network within their region, know how to get to other regions, and know the addresses of nodes contained in the other regions (or just those nodes contained in a backbone area). Thus, hierarchical routing techniques serve to reduce the complexity of routers by shielding the complexity of the network beyond a router's region. The cost, however, of this reduced complexity is that globally shortest paths are not necessarily determined.

Referring to the autonomous system 150 of FIG. 1, the open shortest path first ("OSPF") interior gateway protocol may divide the autonomous system 150 into a number of areas 154, each of which is connected with a backbone area 152. Routers can be classified as follows. "Internal routers" are wholly within one area (See, e.g., routers 153, 160.), "area border routers" connect two or more areas (See, e.g., router 158.), "backbone routers" are in the backbone (See, e.g., router 153.), and "AS boundary routers" neighbor routers in other autonomous systems (See, e.g., routers 112 and 156.). Notice that a given router may belong to more than one class.

§ 1.2.2 The Need for Network Analysis

Recall that different network service providers (e.g., ISPs) may own and/or manage various autonomous systems (ASs). Such providers want to analyze traffic within their network, traffic entering their network from another network (another AS), and traffic leaving their network to another network (another AS). Such traffic analysis may be used when planning capacity, when defining a hierarchical network within an autonomous system, for billing and accounting, and for developing or updating arrangements with the other network service providers (such as peering agreements for example).

For example, if much of a network service provider's traffic goes through another autonomous system, and it has to compensate the owner of that autonomous system (e.g., pursuant to a peering agreement), it may decide to extend its network to avoid that other autonomous system. Alternatively, it may decide that it needs to add more capacity at the gateway between its system and the other autonomous system, or it may decide that it needs to add additional peering points (e.g., AS boundary routers). As another example, if a network service provider services much more traffic from another network service provider than that other network service provider services for it, it may want to be compensated by the other network service provider.

§ 1.2.3 Challenges to Gathering Data for Network Analysis

Often, forwarding devices such as routers are equipped to sample packets, or at least header information in such packets, accepted and forwarded. Unfortunately, however, such samples often will not include information used by traffic analysis tools. For example, such traffic analysis tools will often want network and inter-network information (also referred to as "path-centric" information) not included in such samples. Accordingly, there is a need to associate such samples with information used by traffic analysis tools. Given the potentially large number of packets, such techniques for associating the samples with path-centric information should be efficient, both in terms of processing time and storage. Moreover, it may be desirable to provide various parameters to be analyzed by traffic analysis tools in a convenient form. The generation of such parameters in a convenient form should be efficient, both in terms of processing time and storage.

§ 2. SUMMARY OF THE INVENTION

The present invention may provide a method for associating samples with additional information used by traffic analysis tools, and for providing such sample and/or additional information in a convenient form. The present invention may do so by (a) accepting at least one sample derived from addressed data, (b) determining path-centric information based on the accepted sample(s), and (c) adjusting a traffic metric of a traffic parameter based on the determined path-centric information. In one exemplary embodiment, the addressed data is a packet. In that embodiment, the sample may include information from the header of a packet.

Path-centric information may be determined using at least a part of the sample(s) as a search key to find an item with a closest matching key in a data structure. In one embodiment, the path-centric information may be determined by (a) using at least a part of the sample(s) as a search key to find a first item with a closest matching key in a first data structure, and (b) using at least a part of the first item found as a search key to find path-centric information with a matching key in a second data structure.

The path centric information may include an origin autonomous system and a peer autonomous system, or an autonomous system path. The part of the sample(s) used as a search key may be an internet protocol prefix, a source address, and/or a destination address.

In one embodiment, a traffic metric of a traffic parameter may be adjusted by (a) using a part of the determined path-centric information as a key to search items of traffic parameters, (b) if a traffic parameter with a matching key is found, incrementing its traffic metric, and (c) if none of the traffic parameters has a matching key, creating a new item. The traffic metric adjusted may be a byte count, and/or a packet count.

The present invention may also generate data structures for mapping information in a sample derived from addressed data, to path-centric information. The present invention may do so by (a) building, using network information, a first data structure including items of a first type, each of the items of the first type including an autonomous system index and an internet protocol prefix, wherein the internet protocol prefix is a key, and (b) building, using network information, a second data structure including items of a second type, each of the items of the second type including an autonomous system index and an autonomous system path, wherein the autonomous system index is a key.

The present invention may also provide apparatus for effecting the foregoing methods, as well as data structures for storing information used and/or generated by the foregoing methods.

§ 4. DETAILED DESCRIPTION

The present invention involves methods, apparatus, message formats and data structures for associating samples with information for use by traffic analysis tools. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as the following disclosed methods, apparatus, message formats and data structures, and any other patentable subject matter.

In the following, an exemplary environment in which the present invention may operate is described in § 4.1. Then, high-level applications that may be performed by the present invention are introduced in § 4.2. Then, exemplary operations, apparatus, methods, message formats and data structures that may be used to effect those high-level applications are described in § 4.3. Finally, some conclusions regarding the present invention are set forth in § 4.4.

§ 4.1 ENVIRONMENT IN WHICH THE PRESENT INVENTION MAY OPERATE

The present invention may be used to (i) associate packet samples with path-centric information (e.g., autonomous system path information), (ii) aggregate information from, and/or associated with, the samples, and (iii) export such aggregated information for use by a traffic (flow) analysis tool(s). The network being analyzed may be an autonomous system within an inter-network, such as that 100 depicted in FIG. 1 and introduced in § 1.2.1 above.

Figure 2:
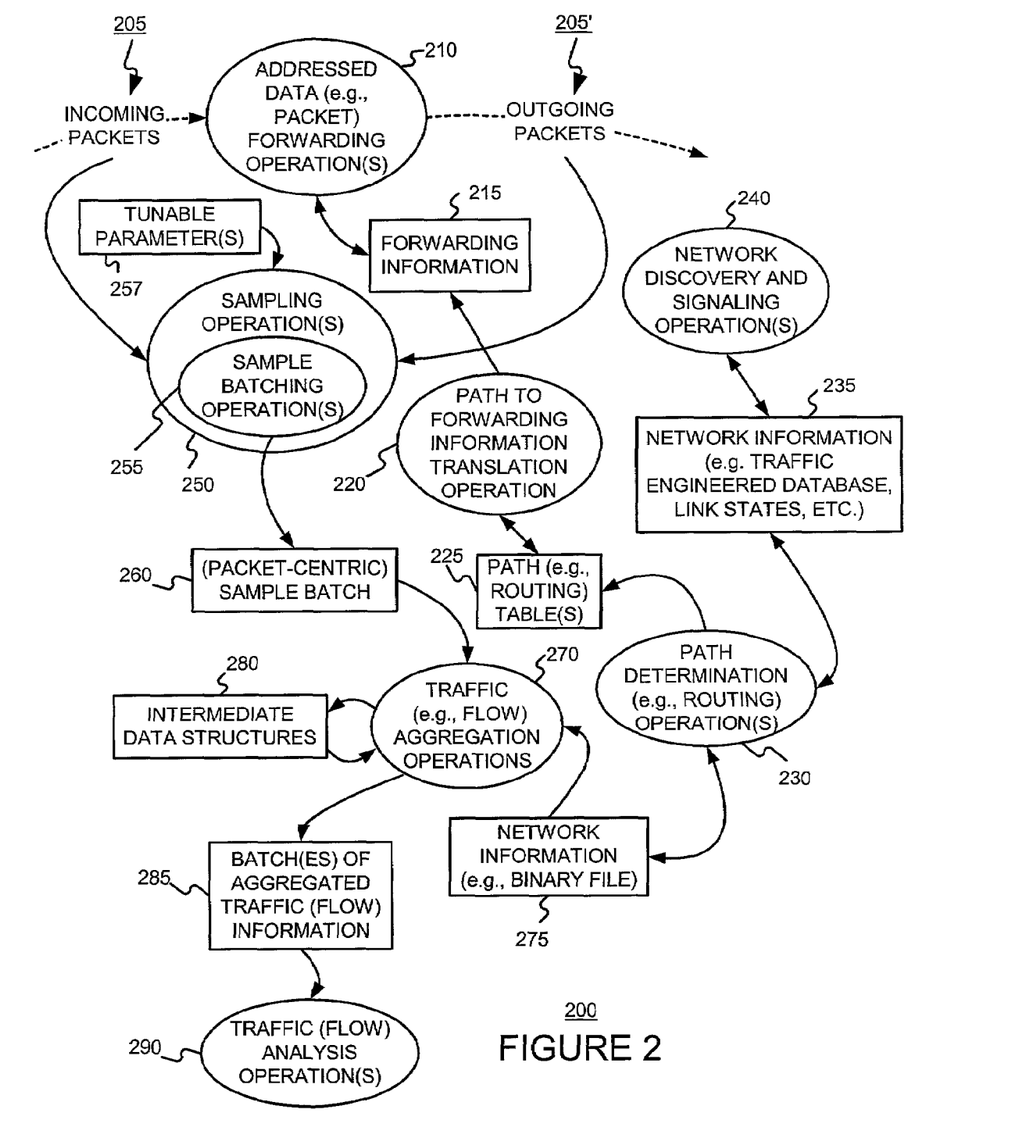
FIG. 2 is a bubble chart of an exemplary node that may be used in the internet of FIG. 1, and in which the present invention may operate.

Various operations performed in accordance with the present invention may take place in a network node for forwarding addressed data, such as a router for example. FIG. 2 is a bubble chart of a router 200. The router 200 may include a packet forwarding operation(s) 210, which forwards inbound packets 205 based on forwarding information (also referred to as a "forwarding table") 215. The forwarding information 215 may be created and managed by a path-to-forwarding information translation operation 220 based on information in a path (e.g., routing) table 225. The routing table 225 may be created and managed by a path determination (e.g., routing) operation(s) 230 which may use standard routing protocols to generate the routing table based on network information (e.g., a traffic engineering database, or a link state database) 235. The path determination operation(s) 230 may implement standard routing protocols including interior gateway protocols such as IS-IS, OSPF, RIP, exterior gateway protocols such as BGP-4, and/or constraint-based or traffic engineered protocols such as MPLS. Such protocols are known to those skilled in the art. The network information 235 used by the path determination operation(s) 230 may be created, disseminated and managed using network discovery and signaling operation(s) 240. Most, if not all, of the foregoing operations and data structures can be implemented with known operations and data structures. Operations more relevant to the present invention are described in § 4.3 below.

§ 4.2 HIGH-LEVEL APPLICATIONS THAT MAY BE PERFORMED BY THE PRESENT INVENTION

Some high-level applications of the present invention may be to (i) take samples of data being forwarded by an addressed data forwarding device, such as a router, (ii) associate such samples with information (e.g., "path-centric" information) used by traffic analysis tools, (iii) aggregate information from, and/or associated with, the samples, and (iv) export such aggregated information for use by a traffic (flow) analysis tool(s). These high-level applications should be performed efficiently, both in terms of processing time and storage.

§ 4.3 EXEMPLARY OPERATIONS, ARCHITECTURE, METHODS AND DATA STRUCTURES

In the following, operations that may be performed by the present invention are introduced in § 4.3.1 below. Then, apparatus, methods, message formats and data structures that may be used to effect those operations are described in § 4.3.2.

§ 4.3.1 OPERATIONS

Referring back to FIG. 2, in addition to the operations and data structures introduced in § 4.1 above, sampling operation(s) 250 may sample incoming and/or outgoing packets 205 and/or 205', respectively. In one embodiment, the sampling occurs as a side effect of a look-up operation. Such samples may be used for traffic (e.g., flow) analysis. The sampling operation(s) 250 may operate in accordance with tunable parameters 257, such as sampling rate, run length, max packet/second, and address family, for example. The optional sample batching operation(s) 255 may aggregate (or batch) the samples into sample batches 260. The (batches of) samples are forwarded to traffic (e.g., flow) aggregation operation(s) 270. The sample batches 260 may be in the form of a frame of samples, such as samples carried in an Ethernet frame for example.

Typically, the samples will include information from the header of the packets (also referred to as "packet-centric information"). Such information may include, for example, a source internet protocol address (i.e., the internet address of the machine originally sending the packet), a destination internet protocol address (i.e., the internet address of the machine to receive the packet), source port, destination port, the protocol used (e.g., INET, ISO, IPX, OSPF, etc.), a type of service to be used in advancing the packet within the network (e.g., best effort, low latency-some data loss (e.g., for voice and video), no data loss (e.g., for file transfers), etc.), and a length of the packet. If a virtual private networks ("VPNs") are to be supported, the packet-centric information may also include an entry point (e.g., an interface) of the packet into the network and/or an exit point (e.g., an interface) of the packet from the network, since IP addresses are not necessarily unique.

Recall that traffic (e.g., flow) analysis operation(s) 290 may want further information (e.g., path-centric information) that will not be found in the samples. Accordingly, traffic (flow) aggregation operation(s) 270 may operate to (i) associate the samples with further information, and (ii) aggregate information from, and/or associated with, the samples, thereby generating traffic (e.g., flow) information 285 to be used by the traffic (flow) analysis operation 290. The information may be supplemented based on transport network information (e.g., a flat binary file) 275 generated by the path determination (e.g., routing) operation(s) 230. To minimize storage and processing resources needed to supplement the samples with path-centric information, the traffic flow (aggregation) operations 270 may manage (e.g., create, update, flush, re-initialize (prune)) various intermediate data structures 280.

Figure 3:
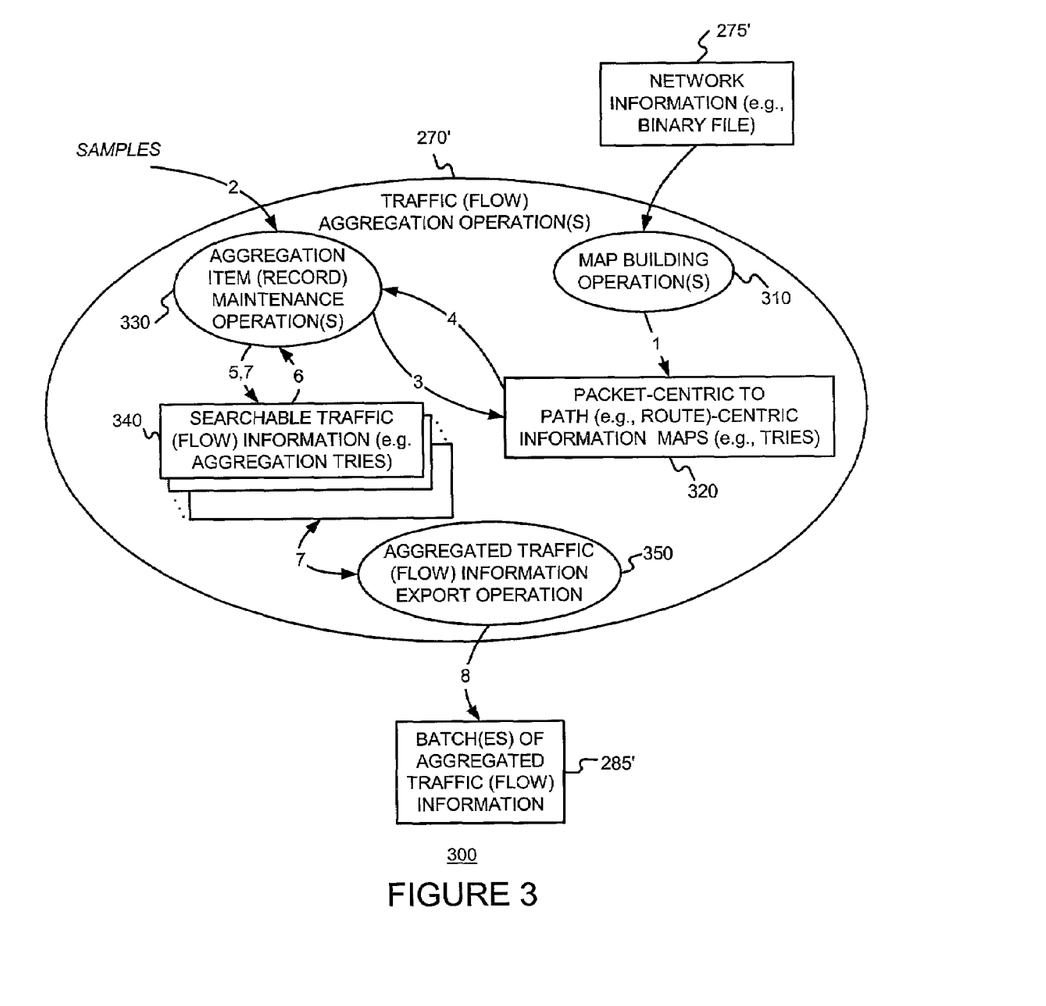
FIG. 3 is a bubble chart of exemplary traffic (flow) aggregation operations that may be performed in accordance with the present invention.

As shown in FIG. 3, in one embodiment, the traffic (flow) aggregation operations 270' may be divided into a number of more specific operations. For example, a map building operation(s) 310 may be used to convert the network information 275' into a data structure 320 for using packet-centric information as an index to path-centric information. In one embodiment, described below, the data structure 320 may include a "Radix" trie using an IP prefix as a key to determine an AS index (from an item or record with a closest matching IP prefix), and a secondary trie using the AS index as a key to determine an AS path (from an item or record with a matching AS index). Further, an aggregation item (record) maintenance operation 330 may accept the samples, find path-centric information associated with each sample using the data structure 320, and aggregate various traffic (flow) information 340 (e.g., as aggregation tries). Further, an aggregated traffic (flow) information export operation 350 may be used to periodically generate a batch(es) of aggregated traffic (flow) information 285' from the various searchable traffic (flow) information 340.

As can be appreciated, these additional operations and data structures may be used to perform the functions introduced in § 4.2 above.

§ 4.3.2 EXEMPLARY EMBODIMENT(S)

Exemplary methods which may be used to effect these operations, as well as exemplary data structures which may be used or created by these operations, are described in § 4.3.2.1 below. Then, systems on which these operations may be effected are described in § 4.3.2.2 below.

§ 4.3.2.1 Exemplary Methods and Data Structures

Figure 4:
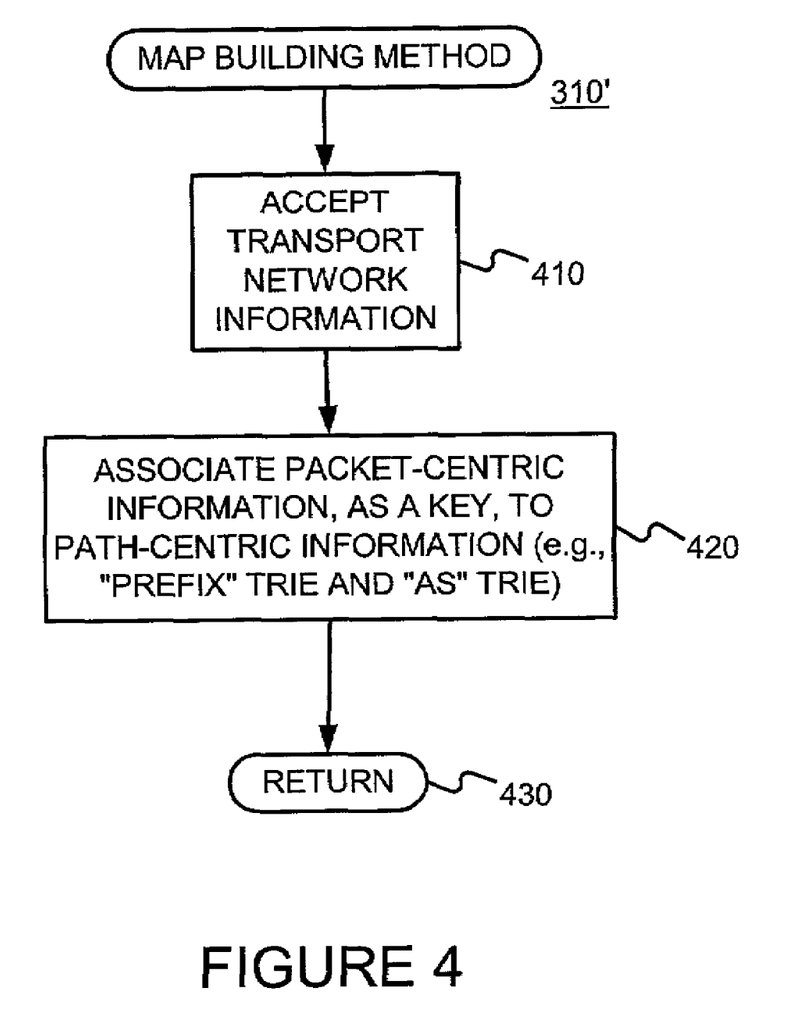
FIG. 4 is a flow diagram of an exemplary map building method that may be used with, or be a part of, a traffic (flow) aggregation operation.

FIG. 4 is a flow diagram of an exemplary map building method 310' that may be used to effect the map building operation 310 of FIG. 3. As indicated in block 410, the transport network information (Recall, e.g., 275 of FIGS. 2 and 275' of FIG. 3.) is accepted. The network information may include various types of records, such as (a) version records, (b) autonomous system path records, (c) route records, (d) extended-route records, (e) maximum records, and/or (f) end-of-file records. A record header may include a type of record, a sub-type of the record, a version, a length, etc. A given route record may include an autonomous system index, a time stamp, a gateway, a prefix length, and a prefix (e.g., source and/or destination IP addresses). An AS path record may include an AS ID of the local router, a number of AS's in a path, a number of AS segments, AS identifiers, an AS index, etc. In one embodiment, the network information 275' is updated by the path determination (e.g., routing) operations 230 when it has something new to write and no higher priority tasks pending.

Still referring to FIG. 4, as indicated in block 420, the packet-centric information from the sample is associated (e.g., as a key to) with path-centric information. This association should be in the form of a data structure (Recall, e.g., 320 of FIG. 3.) that is relatively compact and that permits quick searching. As introduced above, in one exemplary embodiment, the data structure may include a "Radix" trie using an IP prefix as a key to determine an AS index (from an item or record with a closest matching IP prefix), and a secondary trie using the AS index as a key to determine an AS path (from an item or record with a matching AS index).

Figure 5:
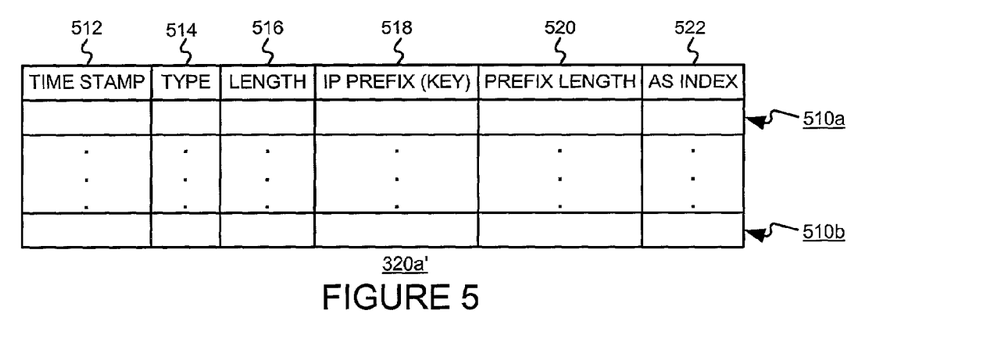
FIG. 5 is an exemplary data structure that may be used to map a key from a packet sample to an autonomous system index key, to be used as a part of a packet-centric information to path-centric information map.

FIG. 5 is an exemplary data structure 320a' for mapping a key from a packet sample to an autonomous system index key. Each of a number of records (or items) 510 may include a time stamp 512, a type 514, a length 516, prefixes (e.g., a source IP address and a destination IP address) 518, a prefix length (i.e., a length of the IP addresses) 520 and an autonomous system index 522. A key 518 for each record or item 510 may be stored in data structure that allows efficient searching. For example, a Radix trie data structure may be used. Alternatively, hashing or binary search trees may be used. In one embodiment, the prefixes (e.g., source and destination IP addresses) and/or a prefix length of a packet sample are used as keys to find an autonomous system index 522 associated with a closest matching prefix 518 and/or prefix length 520, e.g., stored in a Radix trie, in each case. The found AS indexes 522 may then be used as follows.

Figure 6:
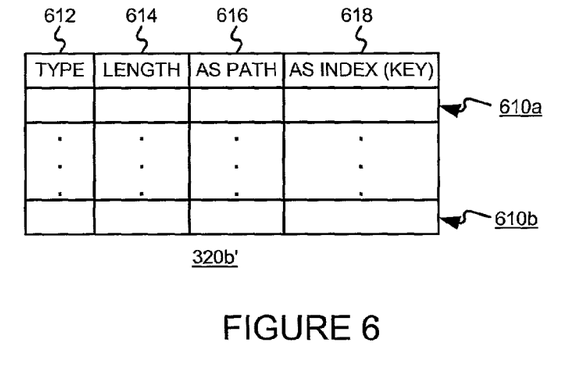
FIG. 6 is an exemplary data structure that may be used to map an autonomous system index key to autonomous system path information, to be used as a part of a packet-centric information to path-centric information map.

FIG. 6 is an exemplary data structure 320b' for mapping an autonomous system index key to autonomous system path information. Each of a number of records (or items) 610 may include a type 612, a length 614, an autonomous system path 616, and an autonomous system index 618. A key 618 for each record or item 610 may be stored in data structure that allows efficient searching. For example, a trie data structure may be used. Alternatively, hashing or binary search trees may be used. In one embodiment, the AS index found is used as a key to find an autonomous system path 616 associated with a matching autonomous system index 618, e.g., stored in a trie. As can be appreciated, in the particular embodiment described, the full AS path is a combination of two partial AS paths—one from the current router back to the source address (derived from the source address prefix), and another from the current router to the destination address (derived from the destination prefix).

Various data structures to permit efficient searching, such as Radix tries and Patricia tries, are known to those skilled in the art. (See, e.g., the text: R. Sedgewick, *Algorithms in C, 3rd Ed.: Parts 1-4, Fundamentals, Data Structures, Sorting, Searching*, pp. 477-692, Addison-Wesley (1998). This text is incorporated herein by reference.)

The items or records of the data structure(s) 320 may be updated periodically and/or upon a condition being met. For example, the items or records may be updated, added, and/or deleted every 60 seconds, if the network information 275 has been changed. Such a change may be indicated by the path determination (e.g., routing) operation.

Although information is shown as being passed from the path determination (e.g., routing) operation 230 to the traffic (flow) aggregation operation(s) via an intermediate file 275, in an alternative embodiment, a software "socket" can be defined between these operations for direct communication of the information.

In the foregoing, a way in which packet-centric information may be mapped to path-centric information was described. Now, exemplary methods which may use such mapping data structures are described.

Figure 7:
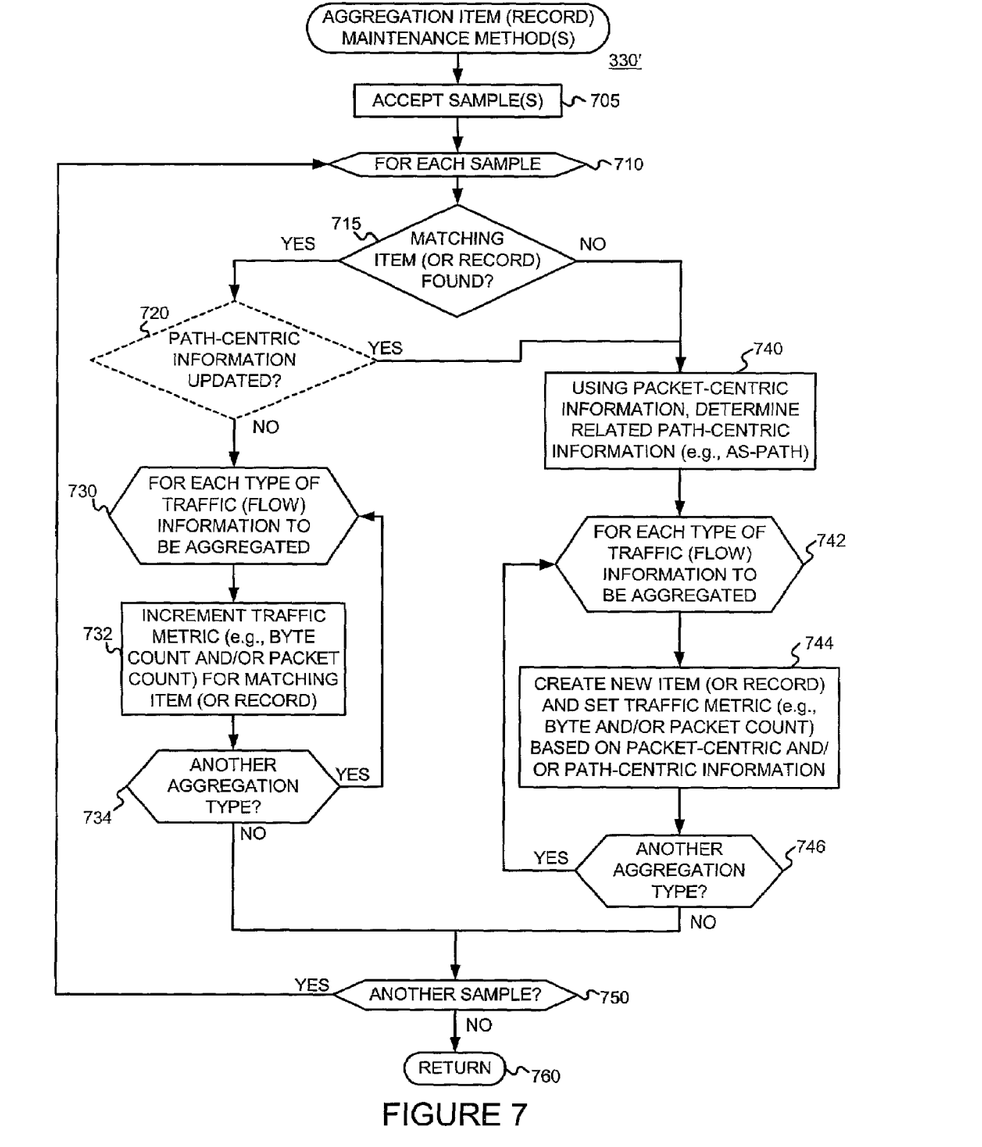
FIG. 7 is a flow diagram of an exemplary aggregation item (record) maintenance method that may be a part of a traffic (flow) aggregation operation.
Figure 8:
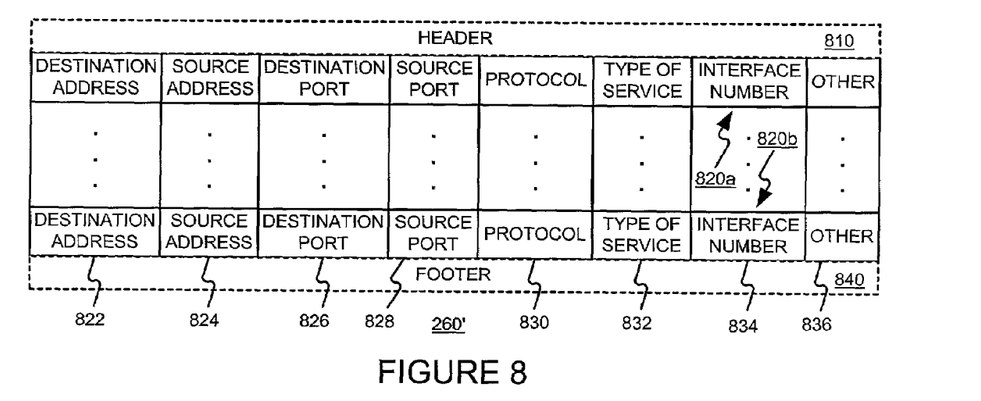
FIG. 8 is a block diagram of an exemplary data structure that may be used to convey a batch of packet samples.

FIG. 7 is a flow diagram of an exemplary aggregation item (record) maintenance method 330' that may be used to effect the aggregation item (record) maintenance operation(s) 330 of FIG. 3. As indicated by block 705, packet samples may be accepted. Recall from FIG. 2 that such samples may be provided in the form of a batch 260. For example, FIG. 8 is a block diagram of an exemplary data structure 260' that may be used to convey a batch of packet samples. As shown in FIG. 8, the batch 260' may include a number of samples 820. Each of the samples 820 may include a destination (e.g., IP) address 822, a source (e.g., IP) address 824, a destination port 826, a source port 828, a protocol 830, a type of service 832, an interface number 834, and other fields 836. A header 810 may be pre-pended the samples 820, and a footer 840 may be appended to the samples 820.

Referring back to FIG. 7, a loop 710-750 may define acts to be performed for each of the samples. More specifically, as indicated by decision branch point 715, it is determined whether or not a matching item (or record) was found. The loop 730-734 may define acts to be performed for each of a number of types of traffic (flow) information (also referred to as "traffic (flow) types") to be aggregated. For example, the traffic (flow) analysis operation(s) 290 may want to analyze a number of parameters, such as byte counts or packet counts, for various port combinations, AS combinations, net combinations (e.g., source and destination IP address pairs), SNMP index, kernel logical interface index, other types of interface indices, etc. Generally, a flow entry is generated and maintained to track a metric (e.g., a byte count and/or a packet count) for packets with the same "flow parameters" (e.g., source and destination IP addresses, input and output ports, origin and peer autonomous systems, etc.) More specifically, the method 330' may manage searchable traffic (flow) information 340. Such information may be stored in the form of separate aggregation tries (e.g., separate "Patricia" tries). As indicated by block 732, for each type of traffic (e.g., flow) information to be aggregated, a traffic metric (e.g., a byte count and/or packet count) is incremented. This is because the information was already associated with the packet-centric information. If, however, the path-centric information was updated since that prior association, the association may no longer be valid. This is accounted for by optional decision branch point 720.

Referring back to decision branch point 715, if a matching item (record) is not found, then using packet-centric information (e.g., source and destination IP addresses), path-centric information (e.g., AS path) may be determined for the sample as indicated by block 740. Recall from the discussion of FIGS. 5 and 6 that this act 740 may be accomplished by (i) using the source and destination IP addresses as search keys to find closest matching keys, and their associated AS indexes, in a Radix trie, and (ii) using the found AS indexes as search keys to find, in each case, a matching key, and its associated AS path, in a secondary trie. Such determined path-centric information may then be associated with the packet-centric information.

As was the case with loop 730-734, loop 742-746 may define acts to be performed for each of a number of types of traffic (flow) information (also referred to as "traffic (flow) types") to be aggregated. For example, the traffic (flow) analysis operation(s) 290 may want to analyze a number of parameters, such as byte counts or packet counts, for various port combinations, AS combinations, net combinations (e.g., source and destination IP address pairs), etc. Generally, a flow entry is generated and maintained to track a metric (e.g., a byte count and/or a packet count) for packets with the same "flow parameters" (e.g., source and destination IP addresses, input and output ports, origin and peer autonomous systems, etc.) More specifically, the method 330' may manage searchable traffic (flow) information 340. Such information may be stored in the form of separate aggregation tries. Accordingly, as indicated in FIG. 7, a new item (or record) is created, and its traffic metric (e.g., byte count and/or packet count) is set based on the relevant part of the associated packet-centric and path-centric information, as indicated by block 744.

Figure 9:
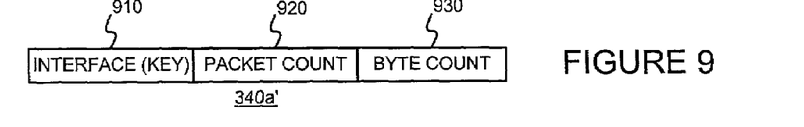
FIGS. 9-14 are exemplary data structures of items (records) that may be part of data structures for holding aggregation data.
Figure 10:
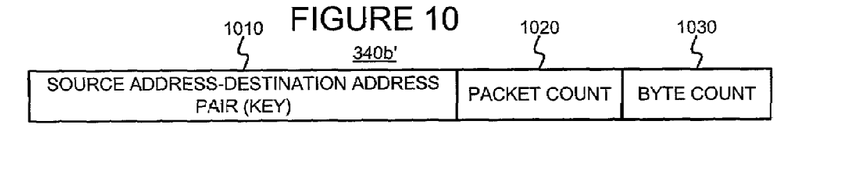
Figure 11:
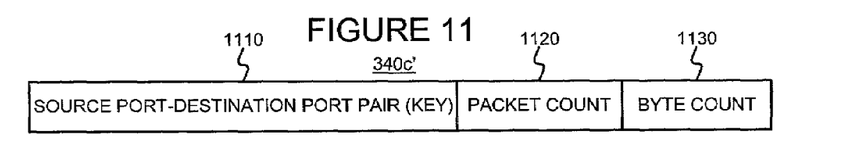
Figure 12:
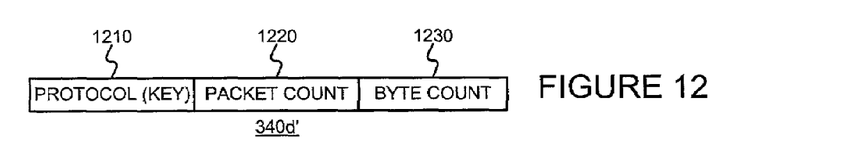
Figure 13:
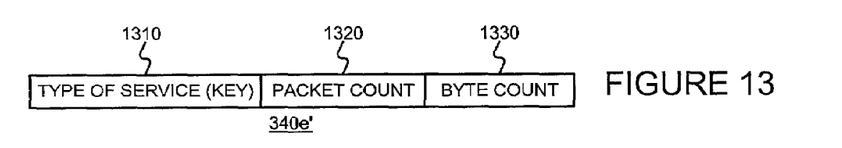
Figure 14:
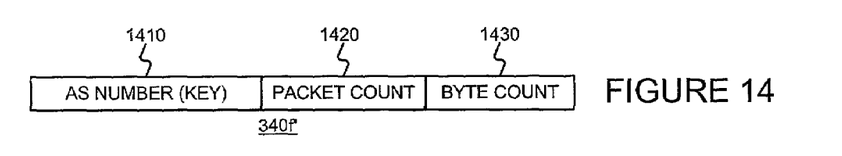

FIGS. 9-14 are exemplary data structures of items (records) that may be part of data structures for holding aggregation data. More specifically, FIG. 9 is an exemplary item (or record) 340a' including an interface (used as a key) 910, and a traffic metric, indicated in this example as a packet count 920 and a byte count 930. FIG. 10 is an exemplary item (or record) 340b' including a source address-destination address pair (used as a key) 1010, and a traffic metric, indicated in this example as a packet count 1020 and a byte count 1030. FIG. 11 is an exemplary item (or record) 340c' including a source port-destination port pair (used as a key) 1110, and a traffic metric, indicated in this example as a packet count 1120 and a byte count 1130. FIG. 12 is an exemplary item (or record) 340d' including a protocol (used as a key) 1210, and a traffic metric, indicated in this example as a packet count 1220 and a byte count 1230. FIG. 13 is an exemplary item (or record) 340e' including a type of service (used as a key) 1310, and a traffic metric, indicated in this example as a packet count 1320 and a byte count 1330. FIG. 14 is an exemplary item (or record) 340f' including an autonomous system (AS) number (used as a key) 1410, and a traffic metric, indicated in this example as a packet count 1420 and a byte count 1430.

As can be appreciated, the information in FIGS. 9-13 can be thought of as packet-centric information, since it is inherent from the packet samples. On the other hand, the information in FIG. 14 can be thought of as path-centric information, since it has to do with the known and/or expected path of the packet through the network(s).

Having described examples of how traffic (flow) information may be aggregated, exemplary methods for exporting the aggregated information are now described.

Figure 15:
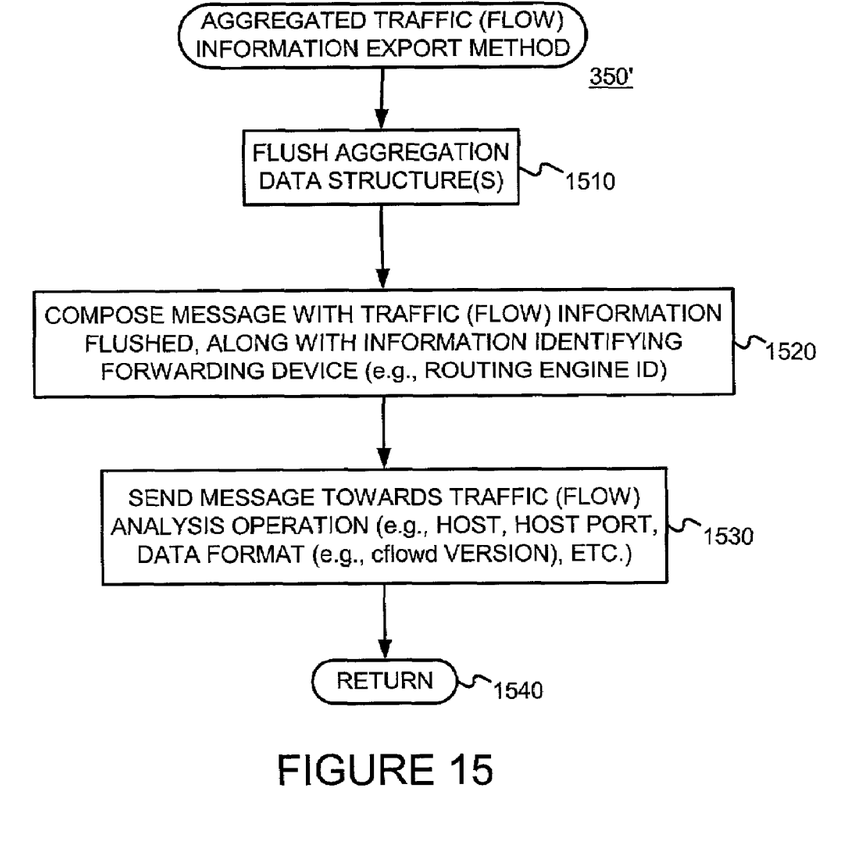
FIG. 15 is a flow diagram of an exemplary aggregated traffic (flow) information export method that may be a part of a traffic aggregation operation.

FIG. 15 is a flow diagram of an exemplary aggregated traffic (flow) export method 350' that may be used to effect an aggregated traffic (flow) export operation 350. As indicated by block 1510, the aggregation data data structures are flushed (i.e., emptied). Then, as indicated by block 1520, a message with the aggregated traffic (flow) information flushed, as well as information identifying the forwarding device (e.g., a routing engine identifier), is composed. Finally, the composed message is sent towards the traffic (flow) analysis operation, as indicated by block 1530. The message sent may also include information identifying the traffic (flow) analysis host, the host port, a format of the data in the message, a version of the traffic (flow) analysis operation, etc. The method 350' is then left via RETURN node 1540. Note that the acts of FIG. 15 may be separately run for each of the aggregated traffic (flow) data structures. (Recall, e.g., FIGS. 9-14.) Although not shown, the flushed data structures holding aggregation data may be re-initialized (e.g., pruned). Such flushing and re-initializing may be performed periodically (e.g., every 60 seconds) so that data structures do not become unwieldy, or overflow available memory.

§ 4.3.2.2 Exemplary Architectures

Figure 16:
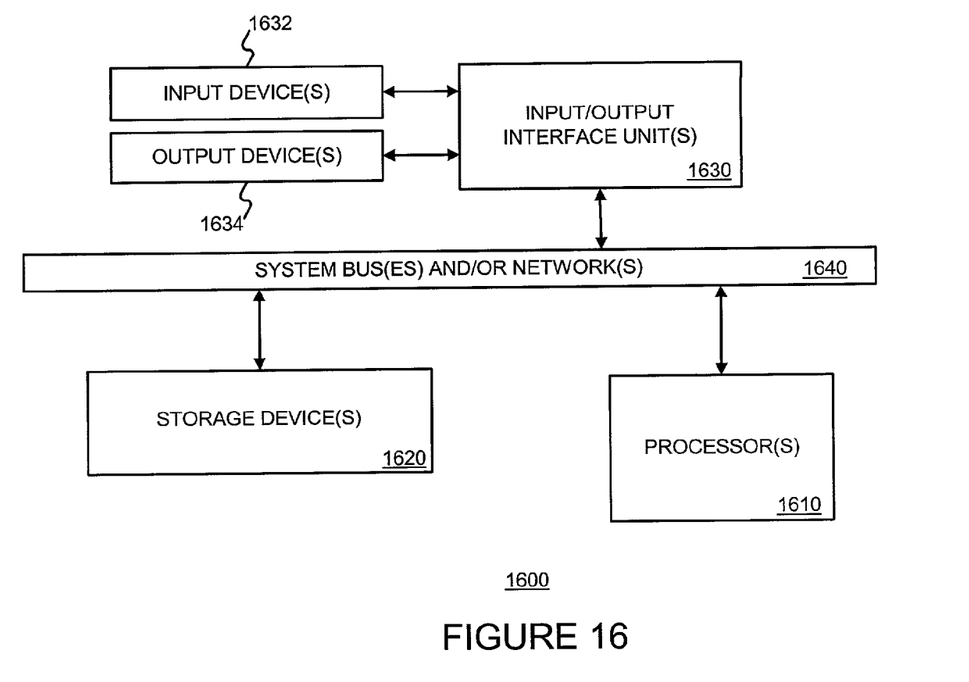
FIG. 16 is a high-level block diagram of an exemplary apparatus that may be used to practice at least some aspects of the invention.

FIG. 16 is high-level block diagram of a machine 1600 that may effect one or more of the operations described above. The machine 1600 basically includes a processor(s) 1610, an input/output interface unit(s) 1630, a storage device(s) 1620, and a system bus(es) and/or a network(s) 1640 for facilitating the communication of information among the coupled elements. An input device(s) 1632 and an output device(s) 1634 may be coupled with the input/output interface(s) 1630. Operations of the present invention may be effected by the processor(s) 1610 executing instructions. The instructions may be stored in the storage device(s) 1620 and/or received via the input/output interface(s) 1630. The instructions may be functionally grouped into processing modules.

The machine 1600 may be a label-switching router for example. In an exemplary router, the processor(s) 1610 may include a microprocessor, a network processor, and/or (e.g., custom) integrated circuit(s). In the exemplary router, the storage device(s) 1620 may include ROM, RAM, SDRAM, SRAM, SSRAM, DRAM, flash drive(s), hard disk drive(s), and/or flash cards. At least some of these storage device(s) 1620 may include program instructions defining an operating system, a protocol daemon, and/or other daemons. In a preferred embodiment, the methods of the present invention may be effected by a microprocessor executing stored program instructions. At least a portion of the machine executable instructions may be stored (temporarily or more permanently) on the storage device(s) 1620 and/or may be received from an external source via an input interface unit 1630. Finally, in the exemplary router, the input/output interface unit(s) 1630, input device(s) 1632 and output device(s) 1634 may include interfaces to terminate communications links.

Figure 17:
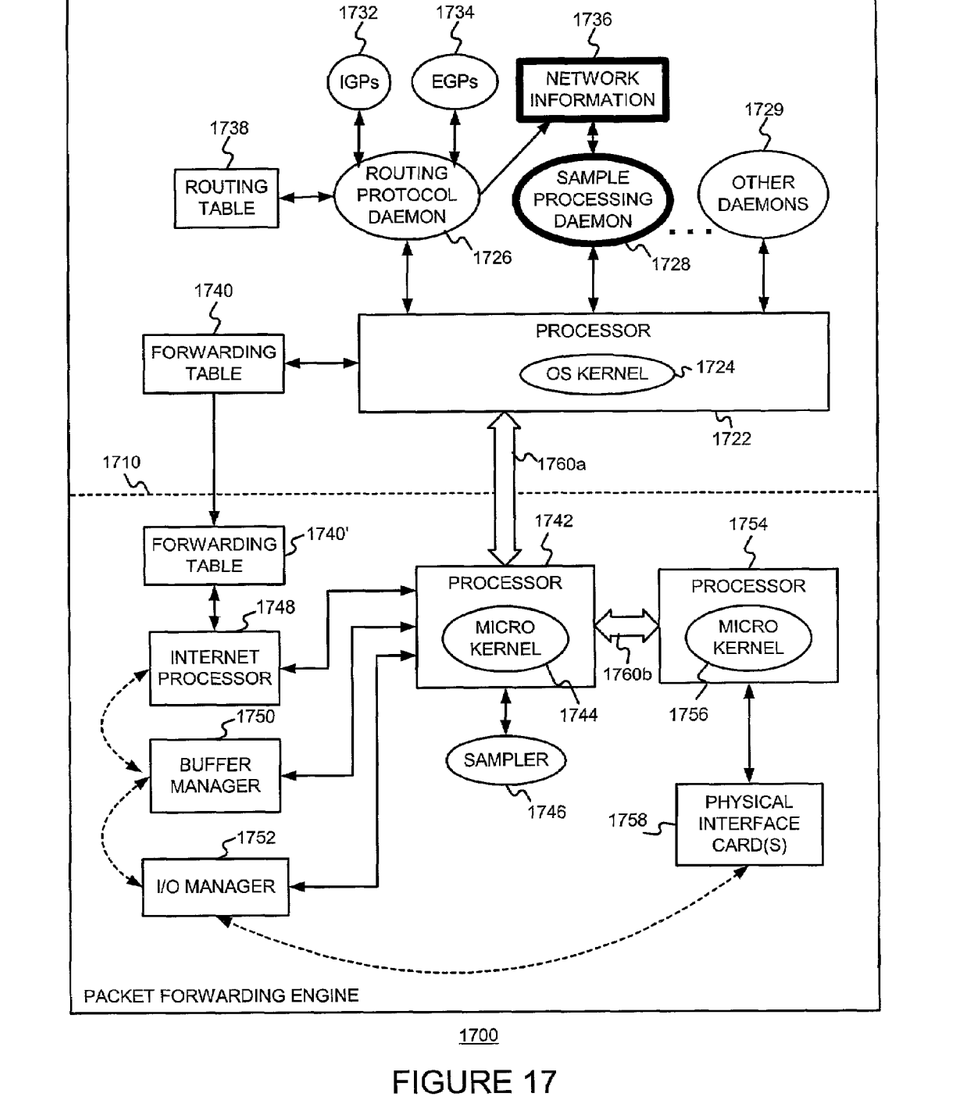
FIG. 17 is a diagram of a router that may be used, among other things, to practice at least some aspects of the invention.

In one exemplary embodiment, the operations of FIG. 2 may take place on a router having a packet-forwarding part (also referred to as a "packet-forwarding engine") and a routing part (also referred to as a "routing engine". For example, FIG. 17 illustrates an exemplary router 1700 having a routing engine (above dashed line 1710) and a packet forwarding engine (below dashed line 1710). The routing engine may include a processor 1722 running an operating system kernel 1724. The processor 1722 may also run a number of daemons, such as a routing protocol daemon 1726, a sample processing daemon 1728, and other daemons 1729. The routing protocol daemon 1726 can support interior gateway protocols 1732 and exterior gateway protocols 1734 to generate a routing table 1738, and can generate network information 1736 used by the sample processing daemon 1728. The processor 1724 can generate a forwarding table 1740 based on the routing table 1738.

In the packet forwarding engine part of the router, an instance 1740' of the forwarding table 1740 may be used to forward packets received and forwarded from physical interface card(s) 1758. More specifically, packets received at a physical interface card 1758 can be processed by an I/O manager card (e.g., an ASIC chip) 1752, a buffer manager card (e.g., an ASIC chip) 1750, and an Internet processor (e.g., an ASIC chip) 1748. The ASIC chips may interact with a processor 1742 supporting micro-kernel 1744. The micro-kernel also interacts with sampler 1746. A second processor 1754 can support a second micro-kernel 1756, which interacts with the physical interface card(s) 1758. A local area network 1760, such as an Ethernet, can support communications among the processors 1722, 1742 and 1754.

Referring to both FIGS. 2, 3 and 17, the packet forwarding engine of FIG. 17 can be responsible for the data forwarding operations 210 of FIG. 2, where the forwarding table 1740' is an exemplary implementation of the forwarding information 215 of FIG. 2 and the sampler 1746 is an exemplary implementation of the sampling operations 250 of FIG. 2. In the routing engine of FIG. 17, the routing protocol daemon is an exemplary implementation of the network discovery and signaling operations 240, the path determination operations 230, and the path to forwarding information translation operations 220 of FIG. 2, the routing table 1738 is an exemplary implementation of the routing tables 225 of FIG. 2, the network information 1736 is an exemplary implementation of the network information 275 of FIG. 2, and the sample processing daemon 1728 is an exemplary implementation of the traffic (flow) aggregation operations 270 of FIG. 2.

Naturally, the operations of the present invention may be effected on systems other than routers, or on routers with different architectures. Such other systems may employ different hardware and/or software.

§ 4.4 CONCLUSIONS

As can be appreciated from the foregoing disclosure, the present invention can process packet samples to generate information for use by traffic (e.g., flow) analysis operations. The present invention may use methods and data structures that afford both efficient storage and fast processing.

What is claimed is:

1. A method for generating traffic information for analysis, the method comprising:
   a) accepting, by a data forwarding device, at least one sample derived from addressed data;
   b) determining, by the data forwarding device, path-centric information based on the accepted at least one sample; and
   c) adjusting, by the data forwarding device, a traffic metric of a traffic parameter based on the determined path-centric information, wherein the act of determining path-centric information based on the accepted at least one sample includes using at least a part of the at least one sample as a search key to find an item with a closest matching key in a data structure.

2. The method of claim 1 wherein the data structure is a searchable data structure selected from a group consisting of (A) a hash table, (B) a binary search tree, and (C) a trie.

3. A method for generating traffic information for analysis, the method comprising:
   a) accepting, by a data forwarding device, at least one sample derived from addressed data;
   b) determining, by the data forwarding device, path-centric information based on the accepted at least one sample; and
   c) adjusting, by the data forwarding device, a traffic metric of a traffic parameter based on the determined path-centric information, wherein the act of determining path-centric information based on the accepted at least one sample includes:
      i) using at least a part of the at least one sample as a search key to find a first item with a closest matching key in a first data structure; and
      ii) using at least a part of the first item found as a search key to find a second item with a matching key in a second data structure.

4. The method of claim 3 wherein the second item includes path-centric information.

5. The method of claim 3 wherein the second item includes an origin autonomous system and a peer autonomous system.

6. The method of claim 3 wherein the second item includes an autonomous system path.

7. The method of claim 3 wherein the first and second data structures are tries.

8. The method of claim 3 wherein the first data structure is a Radix trie.

9. The method of claim 3 wherein the at least a part of the at least one sample used as a search key is an internet protocol prefix.

10. The method of claim 3 wherein the at least a part of the at least one sample used as a search key is at least one of (A) a source address and (B) a destination address.

11. The method of claim 3 wherein the at least a part of the first item found used as a search key is an autonomous system index.

12. A method for generating traffic information for analysis, the method comprising:
   a) accepting, by a data forwarding device, at least one sample derived from addressed data;
   b) determining, by the data forwarding device, path-centric information based on the accepted at least one sample; and
   c) adjusting, by the data forwarding device, a traffic metric of a traffic parameter based on the determined path-centric information, wherein the path-centric information determined includes an origin autonomous system and a peer autonomous system.

13. A method for generating traffic information for analysis, the method comprising:
   a) accepting, by a data forwarding device, at least one sample derived from addressed data;
   b) determining, by the data forwarding device, path-centric information based on the accepted at least one sample; and
   c) adjusting, by the data forwarding device, a traffic metric of a traffic parameter based on the determined path-centric information, wherein the path-centric information determined includes an autonomous system path.

14. A method for generating traffic information for analysis, the method comprising:
   a) accepting, by a data forwarding device, at least one sample derived from addressed data;
   b) determining, by the data forwarding device, path-centric information based on the accepted at least one sample; and
   c) adjusting, by the data forwarding device, a traffic metric of a traffic parameter based on the determined path-centric information, wherein the act of adjusting a traffic metric of a traffic parameter based on the determined path-centric information includes:
      i) using a part of the determined path-centric information as a key to search items of traffic parameters;
      ii) if a traffic parameter with a matching key is found, incrementing its traffic metric;
      iii) if none of the traffic parameters has a matching key, creating a new item.

15. A method for generating traffic information for analysis, the method comprising:
   a) accepting, by a data forwarding device, at least one sample derived from addressed data;
   b) determining, by the data forwarding device, path-centric information based on the accepted at least one sample; and
   c) adjusting, by the data forwarding device, a traffic metric of a traffic parameter based on the determined path-centric information, wherein the traffic metric adjusted is at least one of (A) a byte count and (B) a packet count.

16. A method for generating traffic information for analysis, the method comprising:
   a) accepting, by a data forwarding device, at least one sample derived from addressed data;

b) determining, by the data forwarding device, path-centric information based on the accepted at least one sample; and c) adjusting, by the data forwarding device, a traffic metric of a traffic parameter based on the determined path-centric information, wherein the traffic parameter is selected from a group of traffic parameters consisting of (A) a particular pair of source and destination addresses, (B) a particular pair of source and destination ports, and (C) a particular pair of autonomous systems.

17. An apparatus for generating traffic information for analysis, the apparatus comprising:
   a) an input for accepting at least one sample derived from addressed data;
   b) means for determining path-centric information based on the accepted at least one sample; and
   c) means for adjusting a traffic metric of a traffic parameter based on the determined path-centric information,
   wherein the means for determining path-centric information based on the accepted at least one sample include a searching facility, the search facility (i) using at least a part of the at least one sample as a search key to find a first item with a closest matching key in a first data structure, and (ii) using at least a part of the first item found as a search key to find a second item with a matching key in a second data structure.

18. The apparatus of claim 17 wherein the second item includes path-centric information.

19. The apparatus of claim 17 wherein the second item includes an origin autonomous system and a peer autonomous system.

20. The apparatus of claim 17 wherein the second item includes an autonomous system path.

21. An apparatus for generating traffic information for analysis, the apparatus comprising:
   a) an input for accepting at least one sample derived from addressed data;
   b) means for determining path-centric information based on the accepted at least one sample; and
   c) means for adjusting a traffic metric of a traffic parameter based on the determined path-centric information,
   wherein the means for adjusting a traffic metric of a traffic parameter based on the determined path-centric information include
      i) a search facility, using a part of the determined path-centric information as a key to search items of traffic parameters; and
      ii) an aggregator, wherein if a traffic parameter with a matching key is found, the aggregator increments the traffic metric of the traffic parameter, and wherein if none of the traffic parameters has a matching key, the aggregator creates a new item.

22. An apparatus for generating traffic information for analysis, the apparatus comprising:
   a) an input for accepting at least one sample derived from addressed data;
   b) means for determining path-centric information based on the accepted at least one sample; and
   c) means for adjusting a traffic metric of a traffic parameter based on the determined path-centric information,
   wherein the traffic parameter is selected from a group of traffic parameters consisting of (A) a particular pair of source and destination addresses, (B) a particular pair of source and destination ports, and (C) a particular pair of autonomous systems.

* * * * *